(12) United States Patent
Mizoguchi et al.

(10) Patent No.: US 7,796,402 B2
(45) Date of Patent: Sep. 14, 2010

(54) RADIO APPARATUS INCLUDING NO LESS THAN TWO HOUSINGS

(75) Inventors: Satoshi Mizoguchi, Tokyo (JP); Isao Ohba, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 177 days.

(21) Appl. No.: 11/978,904

(22) Filed: Oct. 30, 2007

(65) Prior Publication Data

US 2008/0158847 A1 Jul. 3, 2008

(30) Foreign Application Priority Data

Dec. 27, 2006 (JP) ............... 2006-352421

(51) Int. Cl.
*H04B 1/03* (2006.01)
(52) U.S. Cl. ..................... 361/814; 361/818
(58) Field of Classification Search ............ 361/800, 361/816, 818, 814; 174/51, 35 R; 343/787, 343/702, 835
See application file for complete search history.

(56) References Cited

U.S. PATENT DOCUMENTS

| | | | | |
|---|---|---|---|---|
| 5,541,813 A * | 7/1996 | Satoh et al. | .................. | 361/752 |
| 5,870,065 A * | 2/1999 | Kanba et al. | ................. | 343/895 |
| 6,650,547 B2 * | 11/2003 | Hemmi et al. | ............... | 361/755 |
| 7,081,853 B2 * | 7/2006 | Amano et al. | ................ | 343/702 |
| 7,102,578 B2 * | 9/2006 | Minemura | ................... | 343/702 |
| 7,130,591 B2 * | 10/2006 | Iwai et al. | ................... | 455/90.3 |
| 7,184,808 B2 * | 2/2007 | Shoji | ........................ | 455/575.7 |
| 7,248,903 B2 * | 7/2007 | Yoda | ........................ | 455/575.1 |
| 7,466,283 B2 * | 12/2008 | Kamitani et al. | ............ | 343/788 |
| 2001/0051510 A1 * | 12/2001 | Nakamura | ................... | 455/90 |
| 2007/0217132 A1 * | 9/2007 | Collins | ........................ | 361/681 |

FOREIGN PATENT DOCUMENTS

JP 2004-304440 A 10/2004
JP 2005-124043 A 5/2005

* cited by examiner

*Primary Examiner*—Hung S Bui
(74) *Attorney, Agent, or Firm*—Frishauf, Holtz, Goodman & Chick, P.C.

(57) ABSTRACT

A radio apparatus includes a first housing containing a first printed circuit board, second housing containing a second printed circuit board and being connected so as to be opened and closed to the first housing, an unbalanced-fed type antenna configured to be fed from one of the first printed circuit board and the second printed circuit board, and a magnetic material layer arranged to be located between the first printed circuit board and the second printed circuit board if the second housing is closed to the first housing.

8 Claims, 7 Drawing Sheets

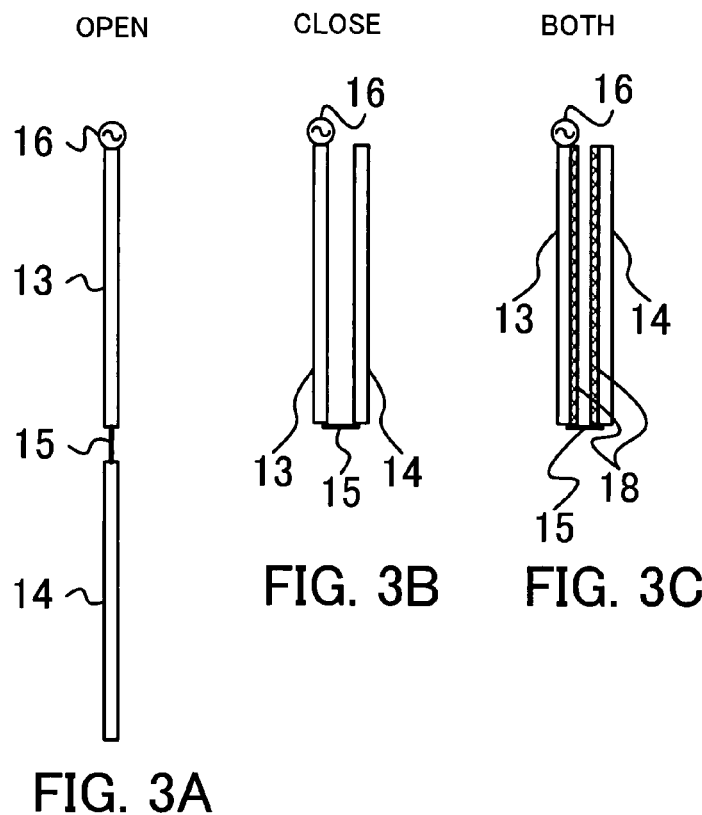
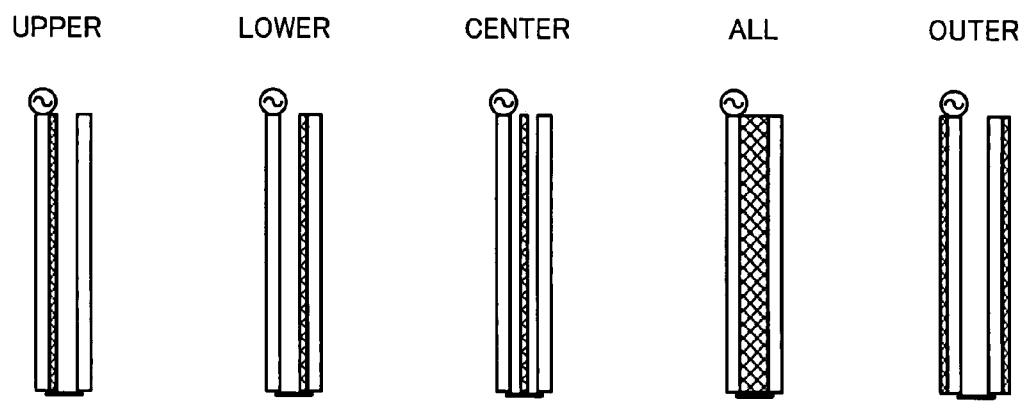

RADIO APPARATUS INCLUDING NO LESS THAN TWO HOUSINGS

CROSS REFERENCE TO RELATED APPLICATIONS

This application is based upon and claims the benefit of priority from the prior Japanese Patent Application No. 2006-352421 filed on Dec. 27, 2006;

the entire contents of which are incorporated herein by reference.

BACKGROUND OF THE INVENTION

1. Field of the Invention

The present invention relates to a radio apparatus, and in particular to a radio apparatus including no less than two housings connected to each other.

2. Description of the Related Art

Portable radio apparatus configured to have no less than two housings which are connected so as to be opened and closed to each other, such as mobile phones, are widely used these days. Such a radio apparatus may be used for voice communication while the housings are opened to each other. The radio apparatus may be used for transmitting and receiving radio waves for data communication, watching television programs and so forth while the housings are closed to each other.

If the housings are closed to each other, an antenna provided in one of the housings and a printed circuit board contained in another one of the housings may be arranged to be close to each other, thus causing impedance of the antenna to be lowered and radiation efficiency of the antenna to be degraded.

Such a problem shall be carefully considered particularly for radio apparatus having a built-in antenna in one of the housings for downsizing, down-weighting and design reasons.

Apart from the above, electromagnetic shielding by using magnetic material has been studied to be applied to radio apparatus like mobile phones so as to suppress unnecessary radiation of radio waves toward human bodies, as disclosed in Japanese Patent Publications of Unexamined Applications (Kokai), No. 2004-304440 and No. 2005-124043.

More specifically, JP 2004-304440 discloses a radio apparatus configured to have a key sheet forming an input device (a key operation portion) and to have radio wave absorbing material formed by a keypad base or keypad buttons for which magnetic material has been mixed. It is mentioned that the above configuration of the radio apparatus may contribute to suppressing radio wave radiation toward human bodies.

Meanwhile, JP 2005-124043 discloses a radio apparatus configured to be provided with a dump sheet containing magnetic material around a display. It is mentioned that the dump sheet containing magnetic material may concentrate magnetic fields of radio frequencies around the display so as to absorb the magnetic fields, thus contributing to suppressing radio wave radiation toward human bodies.

The radio apparatus disclosed in JP 2004-304440 is configured to have the key operation portion near a spot (often called a hotspot) of a housing of the radio apparatus to which radio frequency currents are concentrated so as to control the radio frequency currents.

If the radio apparatus disclosed in JP 2004-304440 is configured to have no less than two housings which are connected so as to be opened and closed to each other, radiation efficiency of an antenna of the radio apparatus may hardly be improved while the two housings are closed depending on a design of the radio apparatus, particularly an arrangement of the key operation portion and a positional relationship with the antenna.

The radio apparatus disclosed in JP 2005-124043 may be considered a same as the radio apparatus disclosed in JP 2004-304440 except that a portion formed by containing magnetic material is arranged not in the key operation portion but around the display.

Thus, if the radio apparatus disclosed in JP 2005-124043 is configured to have no less than two housings which are connected so as to be opened and closed to each other, radiation efficiency of an antenna of the radio apparatus may hardly be improved while the two housings are closed depending on a design of the radio apparatus, particularly an arrangement of the display and a positional relationship with the antenna.

SUMMARY OF THE INVENTION

Accordingly, an object of the present invention is to improve radiation efficiency of a radio apparatus configured to have no less than two housings which are connected so as to be opened and closed to each other while the two housings are closed, independently of an arrangement or a design of each portion of the radio apparatus.

To achieve the above object, according to one aspect of the present invention a radio apparatus includes a first housing containing a first printed circuit board, a second housing containing a second printed circuit board and being connected so as to be opened and closed to the first housing, an unbalanced-fed type antenna configured to be fed from the first printed circuit board or from the second printed circuit board, and a magnetic material layer arranged to be located between the first printed circuit board and the second printed circuit board if the second housing is closed to the first housing.

BRIEF DESCRIPTION OF THE DRAWINGS

FIG. 3A is a side view of an arrangement of the radio apparatus of the first embodiment without the magnetic material layer while the housings are opened.

FIG. 3B is a side view of an arrangement of the main portions of the radio apparatus of the first embodiment without the magnetic material layer while the housings are closed.

FIG. 3C is a side view of an arrangement of the radio apparatus of the first embodiment where the magnetic material layer is arranged on front faces of both of the PCBs.

FIG. 3D is a side view of an arrangement of the radio apparatus of the first embodiment where the magnetic material layer is arranged on the front face of one of the PCBs.

FIG. 3E is a side view of an arrangement of the radio apparatus of the first embodiment where the magnetic material layer is arranged on the front face of another one of the PCBs.

FIG. 3F is a side view of an arrangement of the radio apparatus of the first embodiment where the magnetic material layer is arranged at a center between the PCBs.

FIG. 3G is a side view of an arrangement of the radio apparatus of the first embodiment where the magnetic material layer is arranged to fill up between the PCBs.

FIG. 3H is a side view of an arrangement of the radio apparatus of the first embodiment where the magnetic material layer is arranged on back faces of both of the PCBs.

DETAILED DESCRIPTION OF THE INVENTION

Figure 1:
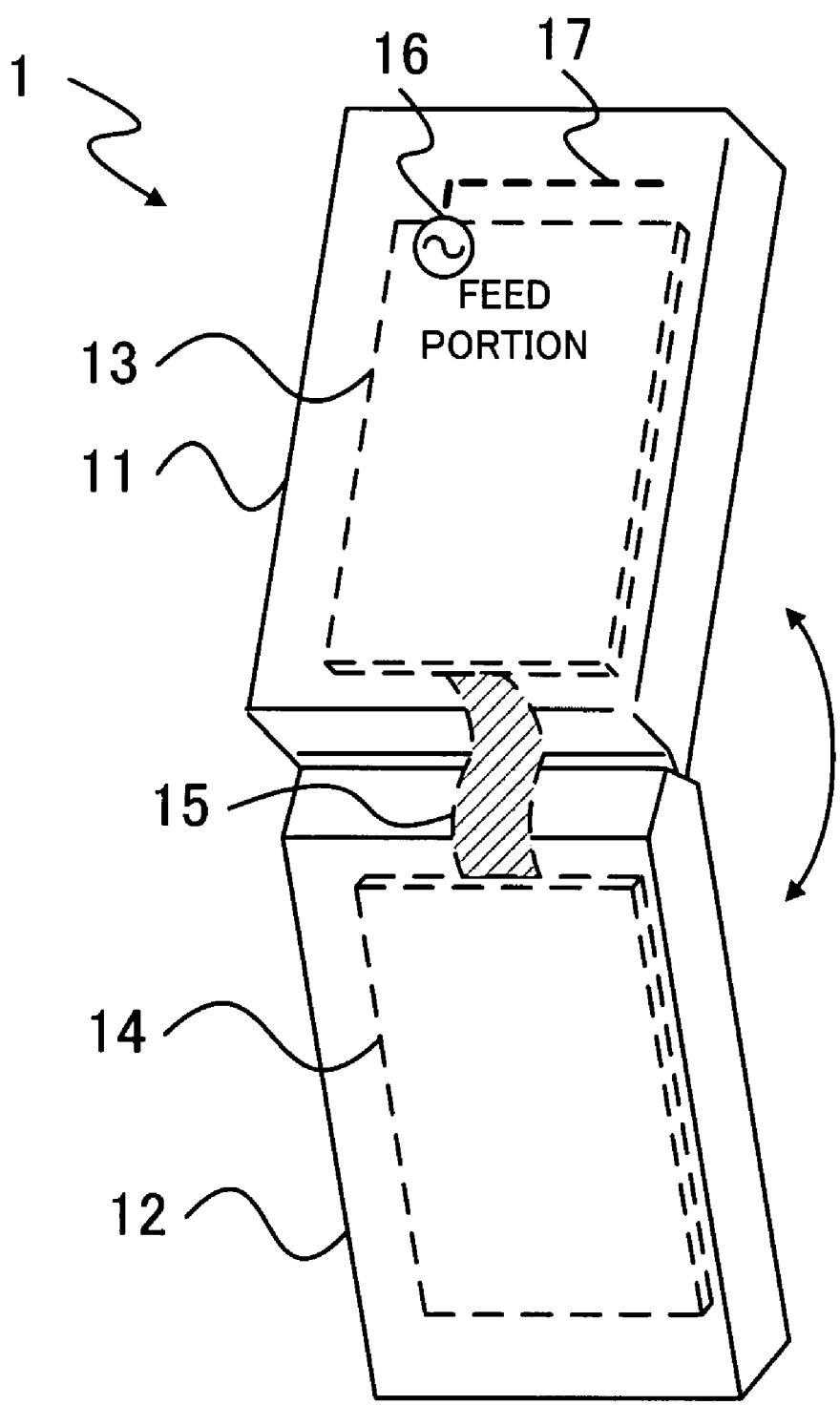
FIG. 1 is an external view of a radio apparatus of a first embodiment of the present invention to show a configuration and a shape of the radio apparatus configured to have two housings and an antenna.

Hereinafter, embodiments of the present invention will be described in detail. In following descriptions, terms such as upper, lower, left, right, horizontal or vertical used while referring to a drawing shall be interpreted on a page of the drawing unless otherwise noted. Besides, a same reference numeral given in no less than two drawings shall represent a same member or a same portion.

A first embodiment of the present invention will be described with reference to FIGS. 1-5. FIG. 1 is an external view of a radio apparatus 1 of the first embodiment of the present invention to show a configuration and a shape of the radio apparatus 1. The radio apparatus 1 has a first housing 11 and a second housing 12. The first housing 11 and the second housing 12 may be folded to each other as indicated by a curved line on a right-hand side of FIG. 1, and the second housing 12 is rotatably connected so as to be opened and closed to the first housing 11 thereby.

The first housing 11 and the second housing 12 have a first printed circuit board (PCB) 13 and a second PCB 14, each of which is indicated by a dashed line in FIG. 1, respectively. The first PCB 13 and the second PCB 14 are electrically connected by a connection member 15, which is shown by hatching surrounded by a dashed outline.

The PCB 13 includes a feed portion 16 arranged near an upper short side of the PCB 13. The feed portion 16 is connected to a radio circuit which is not shown but is provided on the first PCB 13 or on the second PCB 14.

The first housing 11 contains an antenna 17 arranged near an upper end of the first housing 11 (indicated by a dashed line in FIG. 1). In spite of the above arrangement, the antenna 17 may not be placed on an upper side of the radio apparatus 1 while being used. The antenna 17 may be, e.g., but not limited to, an inverted-L shaped monopole type antenna as shown in FIG. 1. The antenna 17 may be of any kind of unbalanced-fed type antennas. The antenna 17 is connected to the radio circuit which is not shown via the feed portion 16.

In addition to the above, the radio apparatus 1 has a magnetic material layer 18 formed by containing magnetic material. A shape and an arrangement of the magnetic material layer 18 will be described with reference to FIG. 2, a perspective view of main portions of the radio apparatus 1 to show shapes of and positional relationships among the first PCB 13, the second PCB 14 and the magnetic material layer 18 while the second housing 12 is closed to the first housing 11.

Figure 2:
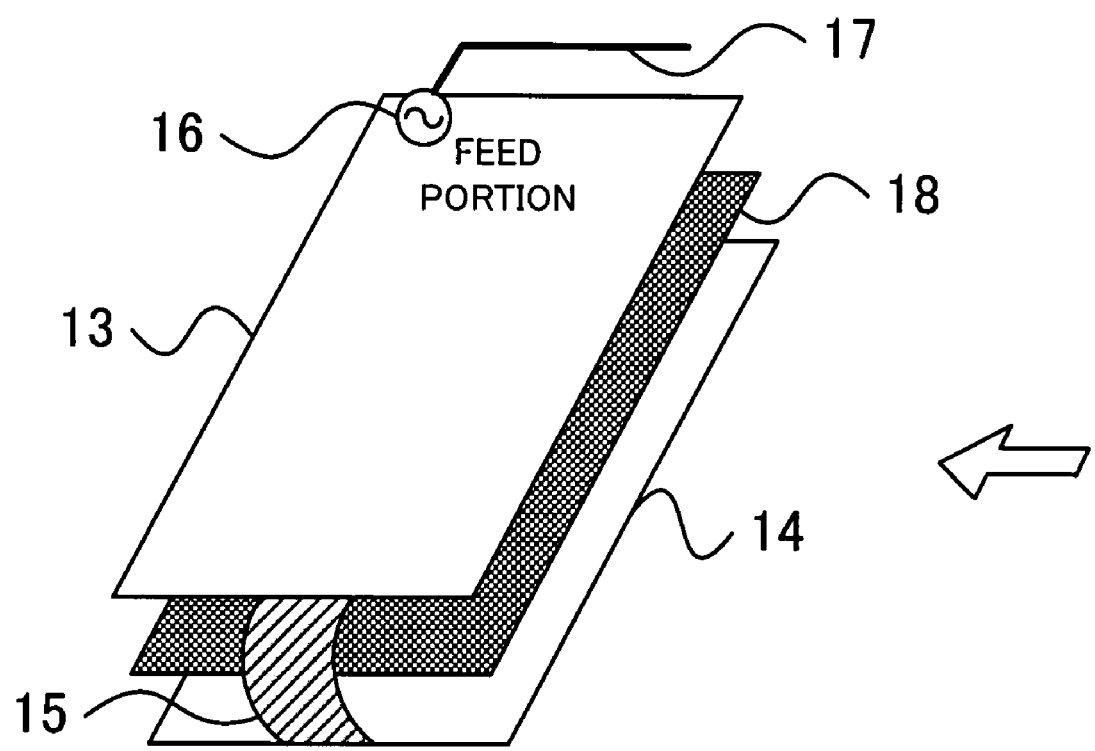
FIG. 2 is a perspective view of main portions of the radio apparatus of the first embodiment to show shapes of and positional relationships among printed circuit boards (PCBs) included in the housings and a magnetic material layer while the housings of the radio apparatus are closed.

As shown in FIG. 2, the first PCB 13, the second PCB 14 and the magnetic material layer 18 have almost a same shape and a same size each. If the second housing 12 is closed to the first housing 11, the magnetic material layer 18 is located between, and almost parallel to, the first PCB 13 and the second PCB 14.

For the above positional relationship shown in FIG. 2, it may be thought that the magnetic material layer 18 is arranged on a face of the first housing 11 or of the first PCB 13 directed to a user during a voice call (called a front face, which is opposite the second housing 12 or the second PCB 14 in FIG. 2). It may also be thought that the magnetic material layer 18 is arranged on a face of the second housing 12 or of the second PCB 14 directed to a user during a voice call (called a front face, which is opposite the first housing 11 or the first PCB 13 in FIG. 2).

Above difference of the arrangement of the magnetic material layer 18 may affect radiation efficiency of the antenna 17 as described with reference to FIGS. 3A-3H and FIGS. 4-5. FIGS. 3A-3H are side views of plural arrangements of the magnetic material layer 18 classified depending on whether or not and how the magnetic material layer 18 is arranged between the first PCB 13 and the second PCB 14. In FIGS. 3A-3H, the antenna 17 is omitted to be shown. Besides, as the arrangements shown in FIGS. 3A-3H have been theoretically given to estimate an influence on the radiation efficiency, practical implementation or feasibility as radio apparatus of some of the arrangements may not have been considered.

FIG. 3A (indicated as "OPEN") is a side view of one of the arrangements without the magnetic material layer 18 while the second housing 12 is opened to the first housing 11, as viewed from a direction indicated by a block arrow shown on a right-hand side of FIG. 2.

FIG. 3B (indicated as "CLOSE") is a side view of the same arrangement without the magnetic material layer 18 as shown in FIG. 3A but while the second housing 12 is closed to the first housing 11 as viewed from the direction indicated by the block arrow shown in FIG.2.

FIG. 3C (indicated as "BOTH") is a side view of another one of the arrangements where the magnetic material layer 18 is arranged on both of the front faces of the first PCB 13 and the second PCB 14.

FIGS. 3D-3H show variations of the arrangement shown in FIG. 3C, where the magnetic material layer 18 is variably arranged. Reference numerals are common to FIGS. 3C-3H, and thus are omitted to be shown in FIGS. 3D-3H.

FIG. 3D (indicated as "UPPER") is a side view of an arrangement where the magnetic material layer 18 is arranged on the front face of the first PCB 13. As the first PCB 13 is located on an upper side in FIG. 2, the arrangement shown in FIG. 3D is indicated as "UPPER" for convenience.

FIG. 3E (indicated as "LOWER") is a side view of an arrangement where the magnetic material layer 18 is arranged on the front face of the second PCB 14. As the second PCB 14 is located on an lower side in FIG. 2, the arrangement shown in FIG. 3E is indicated as "LOWER" for convenience.

FIG. 3F (indicated as "CENTER") is a side view of an arrangement where the magnetic material layer 18 is arranged at a center between the first PCB 13 and the second PCB 14.

FIG. 3G (indicated as "ALL") is a side view of an arrangement where the magnetic material layer 18 is arranged to fill up between the first PCB 13 and the second PCB 14.

FIG. 3H (indicated as "OUTER") is a side view of an arrangement where the magnetic material layer 18 is arranged both on a face back to the front face of the first PCB 13 and on a face back to the front face of the second PCB 14.

Radiation efficiency of the antenna 17 has been calculated by simulation for each of the arrangements shown in FIGS. 3A-3H, and influence of the difference of the arrangements has been estimated. It has been assumed for the simulation that a frequency of 620 megahertz (MHz) is given, and that a long side and a short side of the first PCB 13 or of the second PCB 14 shown in FIG. 2 are 80 millimeters (mm) and 40 mm long, respectively.

It has been assumed for the simulation that the antenna 17 is a half wavelength long as a whole including a value of loaded inductance, and is quasi-loop like shaped by being arranged parallel to the short side of the first PCB 13 and folded back. It has been assumed that relative magnetic permeability and dielectric loss tangent of the magnetic material layer 18 value 40 and 0, respectively.

Figure 4:
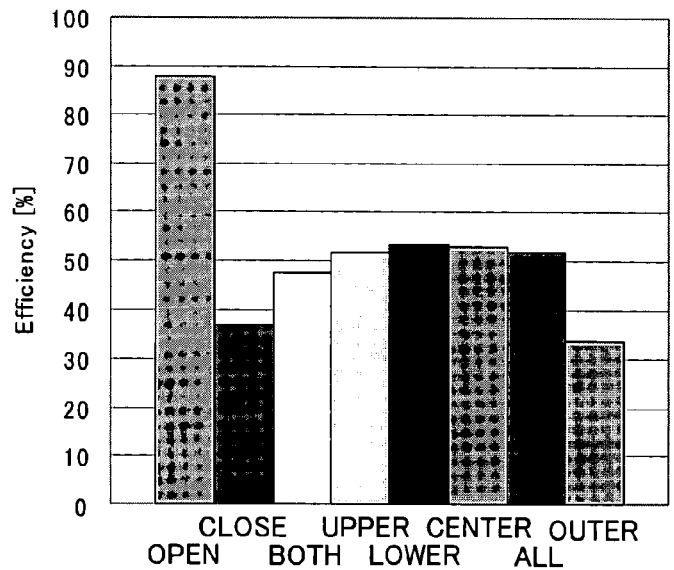
FIG. 4 is a bar chart of radiation efficiency of the antenna of the radio apparatus of the first embodiment estimated by simulation for each of the arrangements shown in FIGS. 3A-3H.

FIG. 4 is a bar chart to show the radiation efficiency estimated by the above simulation for each of the arrangements shown in FIGS. 3A-3H. FIG. 4 has a horizontal axis corresponding to each of the arrangements shown in FIGS. 3A-3H, and a vertical axis representing radiation efficiency in percent normalized to radiation efficiency of the antenna 17 assumed to be in free space.

As shown in FIG. 4, the radiation efficiency values around 89 percent and around 37 percent for the arrangements of "OPEN" and "CLOSE", respectively. That is, if the second housing 12 has been opened and then is closed to the first housing 11 by operation of folding the two housings to each other, e.g., the radiation efficiency is degraded by a ratio of 37 to 89 (around 3.8 decibel (dB)).

Then, the radiation efficiency for the arrangement of "BOTH" values 48 percent. That is, while the second housing 12 is closed to the first housing 11, the radiation efficiency is improved by a ratio of 48 to 37 (around 1.1 dB) by an effect of the magnetic material layer 18 arranged on the front faces of the first PCB 13 and the second PCB 14 each.

As shown in FIG. 4, the radiation efficiency values around 51-53 percent and has no much difference for the arrangements of "UPPER", "LOWER", "CENTER" and "ALL". Among the above, as the arrangement of "ALL" may expect difficulty in implementation or feasibility of a radio apparatus, the arrangements of "UPPER", "LOWER" and "CENTER" may be left as options.

Figure 5:
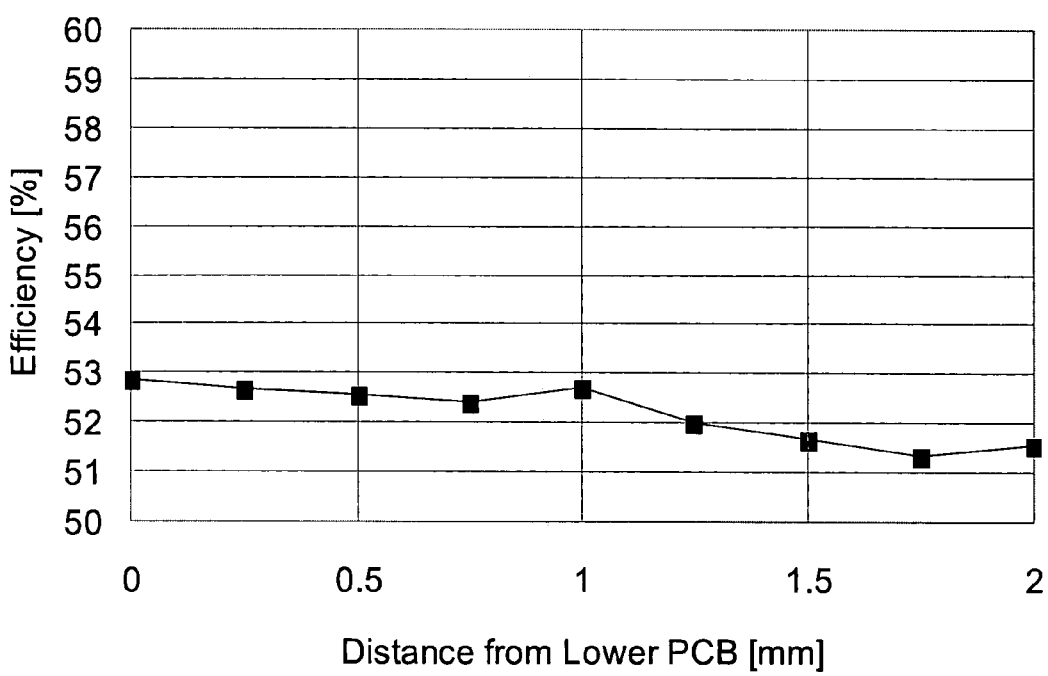
FIG. 5 is a line chart of variation of the radiation efficiency against a separation of the magnetic material from one of the PCBs for the arrangements shown in FIGS. 3D-3F.

FIG. 5 is a line chart of variation of the radiation efficiency against a separation of the magnetic material 18 from the second PCB 14 for the arrangements of "UPPER", "LOWER" or "CENTER". FIG. 4 has a horizontal axis representing the separation of the magnetic material 18 from the second PCB 14 in millimeters (mm), and a vertical axis representing the radiation efficiency in percent normalized to the radiation efficiency of the antenna 17 assumed to be in free space.

As shown in FIG. 5, the radiation efficiency tends to be higher in a case where the separation of the magnetic material layer 18 from the second PCB 14 is no greater than 1 mm than in a case where the above separation is greater than 1 mm. Difference in the radiation efficiency shown in FIG. 5 is, however, only 1.8 percent (around 0.15 dB).

From the mentioned above, the arrangement of "UPPER" or "LOWER" where the magnetic material layer 18 is arranged somewhere between the first PCB 13 and the second PCB 14 is suitable in order that the radiation efficiency of the antenna 17 is improved while the second housing 12 is closed to the first housing 11 (it can be said, however, that the arrangement of "CENTER" is less practical than "UPPER" or "LOWER").

More specifically, it is suitable to arrange the magnetic material layer 18 on the front face of the second PCB 14 (corresponding to "LOWER" shown in FIG. 3E) or on the front face of the first PCB 13 (corresponding to "UPPER" shown in FIG. 3D).

According to the first embodiment of the present invention described above, the radio apparatus including no less than two housings connected so as to be opened and closed to each other may improve antenna's radiation efficiency while the housings are closed by having the magnetic material layer arranged between the PCBs of the housings while the housings are closed.

A second embodiment of the present invention will be described with reference to FIGS. 6A, 6B and 7. In a same way as the radio apparatus 1 of the first embodiment, a radio apparatus 2 of the second embodiment has the first housing 11 and the second housing 12 and is configured and shaped as shown in FIG. 1. In addition to the portions shown in FIG. 1, the radio apparatus 2 has a magnetic material layer 28 formed by containing magnetic material.

A shape and an arrangement of the magnetic material layer 28 will be described with reference to FIGS. 6A and 6B. FIG. 6A is a perspective view of main portions of the radio apparatus 2 to show shapes of and positional relationships among the first PCB 13, the second PCB 14 and the magnetic material layer 28 while the second housing 12 is closed to the first housing 11.

Figure 6A:
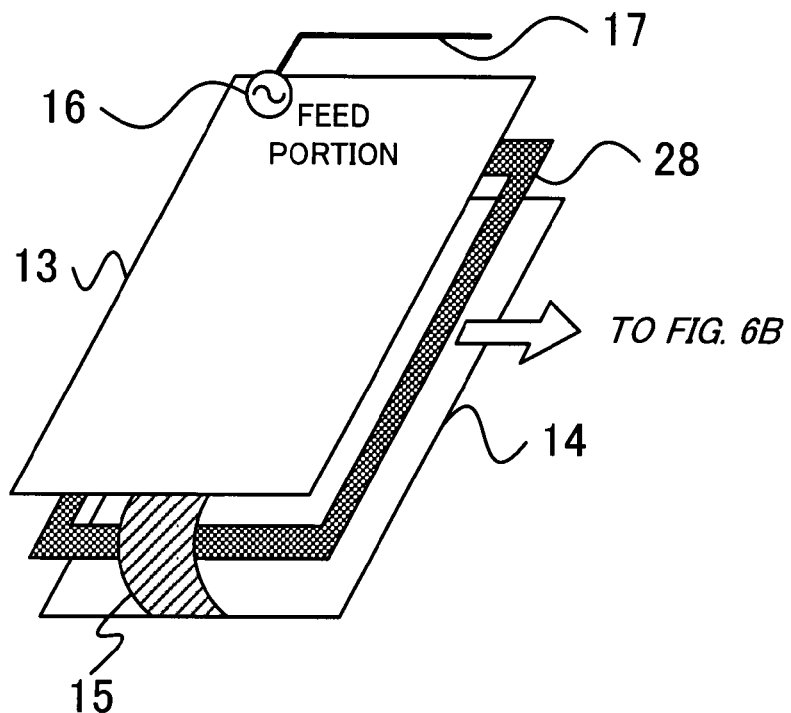
FIG. 6A is a perspective view of main portions of a radio apparatus of a second embodiment to show shapes of and positional relationships among PCBs included in housings and a frame-shaped magnetic material layer while the housings of the radio apparatus are closed.
Figure 6B:
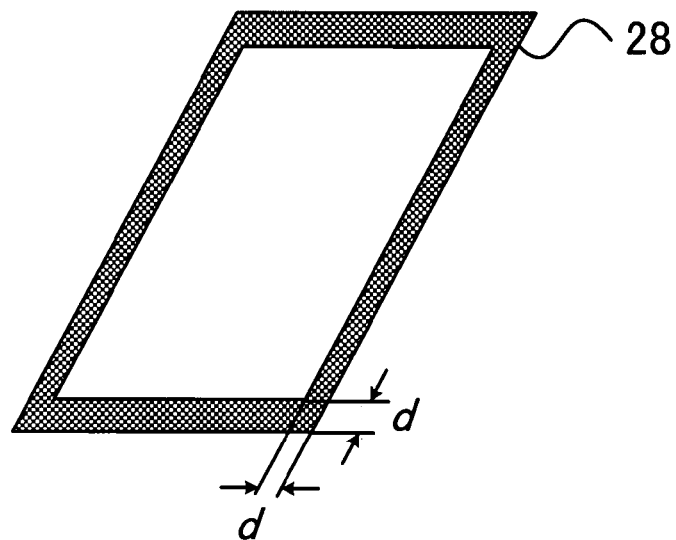
FIG. 6B is a perspective view of the frame-shaped magnetic material layer arranged in the radio apparatus of the second embodiment.

FIG. 6B is a perspective view of the magnetic material layer 28 extracted as shown by a block arrow in FIG. 6A to show a shape of the magnetic material layer 28.

As shown in FIG. 6B, the magnetic material layer 28 is shaped to leave a fringe portion shaped almost same as an outline of the first PCB 13 or of the second PCB 14, and to cut off an area inside the fringe portion. That is, the magnetic material layer 28 is arranged like a picture frame formed by a belt with a width of "d" along a fringe portion of the front face of the first PCB 13 or along a fringe portion of the front face of the second PCB 14.

The magnetic material layer 28 is frame-shaped with the width of "d" along the fringe portion of the first PCB 13 or of the second PCB 14, so as to be arranged without interrupting arrangement of, e.g., a display, user controls and other circuits in an internal area of the first PCB 13 or of the second PCB 14.

It is expected that the width of "d" of the magnetic material layer 28 may affect the radiation efficiency of the antenna 17 while the second housing 12 is closed to the first housing 11. Thus, influence of the width of "d" has been estimated by simulation done in a same way as the simulation of the first embodiment.

A result of the simulation will be explained with reference to FIG. 7, a line chart of variation of the radiation efficiency of the antenna 17 against values of the width of "d". FIG. 7 has a horizontal axis representing the values of the width of "d"

(in mm) and a vertical axis representing the radiation efficiency in percent normalized to the radiation efficiency of the antenna 17 assumed to be in free space.

Conditions of the simulation (a frequency, sizes of the first PCB 13 and the second PCB 14, a shape of the antenna 17, relative magnetic permeability and dielectric loss tangent of the magnetic material layer 28) have been assumed to be same as the conditions of the simulation of the first embodiment.

Figure 7:
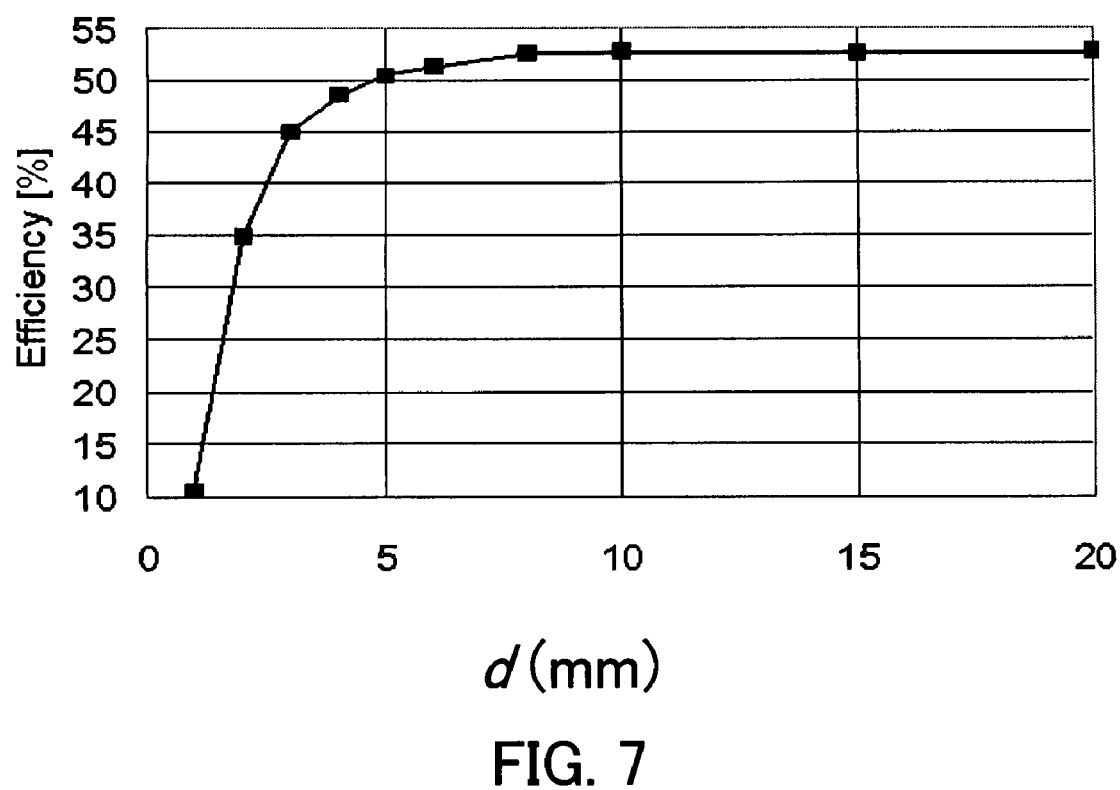
FIG. 7 is a line chart of variation of antenna radiation efficiency of the radio apparatus of the second embodiment against values of a width of the frame-shaped magnetic material layer.

Although being quite low to be 10 percent (−10 dB) for d=1 mm, as shown in FIG. 7, the radiation efficiency is rapidly improved for d≧2 mm and is saturated at 53 percent for d≧8 mm. That is, even if the magnetic material layer 28 is not arranged on the whole front face of the first PCB 13 or of the second PCB 14, the radiation efficiency may be by no means inferior.

If the radiation efficiency of 45 percent (around −3.5 dB) is given as a reasonable criterion, as shown in FIG. 7, the width of the magnetic material layer 28 must be d≧3 mm. As the frequency of the simulation has been assumed to be 620 MHz, the width of d=3 mm generally corresponds to around six thousandth wavelength.

Figure 8:
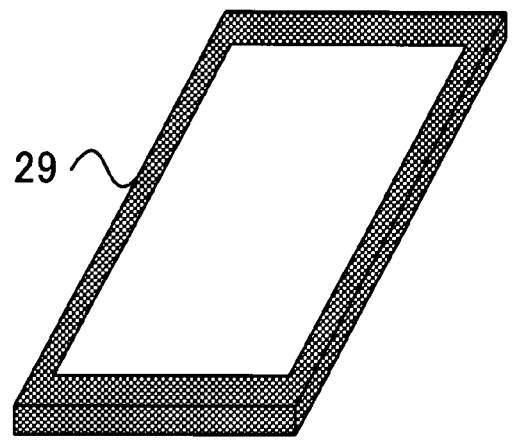
FIG. 8 is a perspective view of a magnetic material layer of a modification of the second embodiment.

A modification of the second embodiment will be explained with reference to FIG. 8. This modification has a magnetic material layer 29 deformed from the magnetic material layer 28 of the radio apparatus 2. FIG. 8 is a perspective view of the magnetic material layer 29 to show the shape of the magnetic material layer 29.

The magnetic material layer 29 has a portion arranged along the fringe portion of the front face of the first PCB 13 or of the second PCB 14 as the magnetic material layer 28 has, as well as a portion covering an edge face of the first PCB 13 or of the second PCB 14 as continued from the front face. In the above description, the edge face is a section of a material base which has been cut to form the first PCB 13 or the second PCB 14, and has a width equal to a thickness of the PCBs.

The magnetic material layer 29 may be arranged on the front face and on a side face (either inner or outer) of the first housing 11, instead of the fringe portion of the front face and the edge face of the first PCB 13. The magnetic material layer 29 may be arranged on the front face and on a side face (either inner or outer) of the second housing 12, instead of the fringe portion of the front face and the edge face of the second PCB 14.

As shown in FIG. 7, the radiation efficiency has been estimated to be 35 percent for d=2 mm by the simulation on the assumption that the magnetic material layer 28 is used. Another simulation done in a similar manner but on an assumption that the magnetic material layer 29 is used instead of the magnetic material layer 28 has produced a result that the radiation efficiency improves to 47 percent.

Why the radiation efficiency improves will be explained as follows. If the antenna 17 is excited, radio frequency currents of relatively large values are distributed along the edge faces of the first PCB 13 or of the second PCB 14. Thus, the shape of the magnetic material layer 29 covering the edge faces may contribute to improving the radiation efficiency.

According to the second embodiment of the present invention described above, an additional effect may be obtained that the magnetic material layer covering only the fringe portion of the PCB may contribute to improving the radiation efficiency.

A third embodiment of the present invention will be described with reference to FIG. 9. In a same way as the radio apparatus 1 of the first embodiment, a radio apparatus 3 of the third embodiment has the first housing 11 and the second housing 12 and is configured and shaped as shown in FIG. 1. In addition to the portions shown in FIG. 1, the radio apparatus 3 has a magnetic material layer 38 formed by containing magnetic material.

A shape and an arrangement of the magnetic material layer 38 will be described with reference to FIG. 9, a perspective view of a main portion of the radio apparatus 3 to show shapes of and positional relationships among the first PCB 13, the second PCB 14 and the magnetic material layer 38 while the second housing 12 is closed to the first housing 11.

Figure 9:
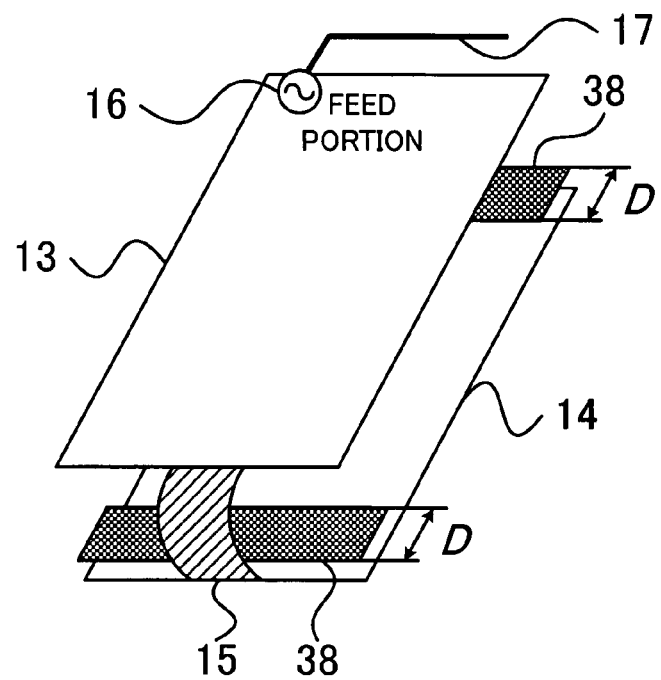
FIG. 9 is a perspective view of main portions of a radio apparatus of a third embodiment to show shapes of and positional relationships among PCBs included in housings and a magnetic material layer while the housings of the radio apparatus are closed.

As shown in FIG. 9, the magnetic material layer 28 is shaped to leave an area corresponding to portions along upper and lower short sides of the first PCB 13 or of the second PCB 14. That is, the magnetic material layer 28 is arranged like a belt with a width of "D" along both the short sides of the front face of the first PCB 13 or along both the short sides of the front face of the second PCB 14.

The magnetic material layer 28 is shaped like a belt with the width of "D" along both the short sides of the front face of the first PCB 13 or of the second PCB 14, so as to be arranged without interrupting arrangement of, e.g., a display, user controls and other circuits in an internal area of the first PCB 13 or of the second PCB 14.

It is expected that the width of "D" of the magnetic material layer 38 may affect the radiation efficiency of the antenna 17 while the second housing 12 is closed to the first housing 11. Thus, influence of the width of "D" has been estimated by simulation done in a same way as the simulation of the first embodiment.

As shown in FIG. 7, the radiation efficiency has been estimated to be 53 percent for d=8 mm by the simulation on the assumption that the magnetic material layer 28 is used. Another simulation done in a similar manner but on an assumption that the magnetic material layer 38 is used instead of the magnetic material layer 28 has produced a result that the radiation efficiency is 52 percent, and there is not much difference with the case where the magnetic material layer 28 is used.

Why the radiation efficiency does not make much difference will be explained as follows. If the antenna 17 is excited, radio frequency currents of relatively large values are distributed along the short sides of the first PCB 13 or of the second PCB 14. Thus, the shape of the magnetic material layer 38 covering the areas along the PCB short sides may contribute to keeping an effect of the improved radiation efficiency.

According to the third embodiment of the present invention described above, another additional effect may be obtained that the magnetic material layer covering only the areas along the PCB short sides may contribute to improving the radiation efficiency.

In the above description of the embodiments, the shapes, the configurations, the sizes, etc. are considered as exemplary only, and thus may be variously modified within the scope of the present invention. For example, connection structure between the two housings forming the radio apparatus is not limited to the foldable type, but may be so called a sliding type or a double swivel type.

If the connection structure is of the sliding type, the first housing 11 and the second housing 12 are connected so as to slide against each other. If the connection structure is of the double swivel type, the first housing 11 and the second housing 12 are connected so as to rotate around two axes which are perpendicular to each other.

In a case of the double swivel type, the magnetic material layer should be arranged between the first housing 11 and the second housing 12 while the housings are closed, based upon consideration that there are plural pairs of faces of the housings which are opposite to each other.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A radio apparatus, comprising:
a first housing containing a first printed circuit board;
a second housing containing a second printed circuit board, the second housing being connected to the first housing so as to be openable and closeable with respect to the first housing;
an unbalanced-fed type antenna configured to be fed from one of the first printed circuit board and the second printed circuit board; and
a magnetic material layer arranged to be located between the first printed circuit board and the second printed circuit board if the second housing is closed with respect to the first housing, wherein only a single layer of the magnetic material layer is provided in the first housing or the second housing.

2. The radio apparatus of claim 1, wherein the magnetic material layer is arranged on a face of the second printed circuit board, the face being opposite the first housing if the second housing is closed with respect to the first housing.

3. The radio apparatus of claim 1, wherein the magnetic material layer is arranged on a fringe portion of a face of the second printed circuit board, the face being opposite the first housing if the second housing is closed with respect to the first housing.

4. The radio apparatus of claim 3, wherein the magnetic material layer has a width no less than six thousandth wavelength of a frequency of use.

5. The radio apparatus of claim 1, wherein the magnetic material layer is arranged on a portion along a short side of a face of the second printed circuit board, the face being opposite the first housing if the second housing is closed with respect to the first housing.

6. The radio apparatus of claim 1, wherein the first housing and the second housing are connected so as to be folded to each other.

7. The radio apparatus of claim 1, wherein the first housing and the second housing are connected so as to slide against each other.

8. The radio apparatus of claim 1, wherein the first housing and the second housing are connected so as to rotate around two axes which are perpendicular to each other.

* * * * *